United States Patent
Kim et al.

(10) Patent No.: US 8,536,845 B2
(45) Date of Patent: Sep. 17, 2013

(54) LDO REGULATOR AND SEMICONDUCTOR DEVICE INCLUDING THE SAME

(75) Inventors: Kwang-ho Kim, Suwon-si (KR); Jin-hyuk Jeung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 719 days.

(21) Appl. No.: 12/660,859

(22) Filed: Mar. 5, 2010

(65) Prior Publication Data
US 2010/0253299 A1  Oct. 7, 2010

(30) Foreign Application Priority Data
Apr. 7, 2009  (KR) .................. 10-2009-0029881

(51) Int. Cl.
*G05F 1/40* (2006.01)
(52) U.S. Cl.
USPC .......................... 323/274; 323/276
(58) Field of Classification Search
USPC ................. 323/273–277, 279–285
See application file for complete search history.

(56) References Cited

U.S. PATENT DOCUMENTS

| | | | | |
|---|---|---|---|---|
| 5,710,508 A * | 1/1998 | Watanabe | | 323/284 |
| 6,414,537 B1 * | 7/2002 | Smith | | 327/540 |
| 6,617,833 B1 * | 9/2003 | Xi | | 323/282 |
| 7,498,780 B2 * | 3/2009 | Chen et al. | | 323/273 |
| 7,855,535 B2 * | 12/2010 | Tiew et al. | | 323/274 |
| 8,169,202 B2 * | 5/2012 | Chen | | 323/273 |
| 2006/0261797 A1 | 11/2006 | Man et al. | | |
| 2008/0180071 A1 | 7/2008 | Moraveji | | |

FOREIGN PATENT DOCUMENTS

| KR | 1020030089548 A | 11/2003 |
|---|---|---|
| KR | 1020060039627 A | 11/2006 |

* cited by examiner

*Primary Examiner* — Jessica Han
(74) *Attorney, Agent, or Firm* — Onello & Mello, LLP

(57) ABSTRACT

In a low drop out (LDO) regulator and a semiconductor device including the LDO regulator, the LDO regulator regulates a power supply voltage and applies the regulated power supply voltage to a load. The LDO regulator comprises: an output node connected to the load; a pass transistor that applies a power supply voltage to the output node; and a controller that generates a load enable signal enabling the load by delaying a regulator enable signal by a first delay time, and that increases a gate voltage of the pass transistor after receiving the regulator enable signal to thereby reduce a current flowing through the pass transistor.

19 Claims, 3 Drawing Sheets

LDO REGULATOR AND SEMICONDUCTOR DEVICE INCLUDING THE SAME

CROSS-REFERENCE TO RELATED APPLICATIONS

This application claims the benefit of Korean Patent Application No. 10-2009-0029881, filed on Apr. 7, 2009, in the Korean Intellectual Property Office, the disclosure of which is incorporated herein in its entirety by reference.

BACKGROUND

The inventive concept relates to a semiconductor device, and more particularly, to a low drop out (LDO) regulator that prevents occurrences of an overshooting voltage and an inrush current, and a semiconductor device including the LDO regulator.

A low drop out (LDO) regulator regulates a voltage corresponding to a voltage of an input universal serial bus (UBS) or a battery, and supplies the required current for supplying a load.

SUMMARY

The inventive concept provides a low drop out (LDO) regulator that prevents an overshooting voltage, an inrush current, malfunction and damage of a load, and a semiconductor device including the LDO regulator.

In one aspect, a low drop out (LDO) regulator regulates a power supply voltage and applies the regulated power supply voltage to a load, the LDO regulator comprising: an output node connected to the load; a pass transistor that applies a power supply voltage to the output node; and a controller that generates a load enable signal enabling the load by delaying a regulator enable signal by a first delay time, and that increases a gate voltage of the pass transistor after receiving the regulator enable signal to thereby reduce a current flowing through the pass transistor.

In one embodiment, the LDO regulator further comprises an error amplifier that outputs a first gating signal controlling gating of the pass transistor, a voltage of the first gating signal corresponding to a difference between a reference voltage and a feedback voltage, the feedback voltage corresponding to a voltage of the output node.

In another embodiment, the power supply voltage is a voltage of a universal serial bus (USB) or a voltage of a battery.

In another embodiment, the controller comprises: a buffer that buffers the regulator enable signal; a delay cell that delays an output of the buffer by the first delay time; an inverter that inverts an output of the delay cell; a logical conjunction performing unit that performs a logical conjunction operation with respect to the output of the buffer and an output of the inverter, and that outputs a second gating signal that causes an increase in the gate voltage of the pass transistor to a voltage corresponding to the power supply voltage; and a Sheffer stroke performing unit that performs a Sheffer stroke operation with respect to the output of the buffer and the output of the delay cell, and that outputs the load enable signal.

In another embodiment, the LDO regulator further comprises: a PMOS diode having one terminal connected to the power supply voltage; and a PMOS transistor having one terminal connected to another terminal of the PMOS diode and having another terminal connected to the gate of the pass transistor, the PMOS transistor being activated by the second gating signal, and the PMOS transistor applying the voltage corresponding to the power supply voltage to the gate voltage of the pass transistor.

In another embodiment, a semiconductor device comprises the LDO regulator.

In another aspect, a low drop out (LDO) regulator regulates a power supply voltage and that applies the regulated power supply voltage to a load, the LDO regulator comprising: an output node connected to the load; a pass transistor that applies a power supply voltage to the output node; and a controller that generates a load enable signal by delaying a regulator enable signal by a first delay time and that enables the load.

In one embodiment, the controller comprises: a buffer that buffers the regulator enable signal; a delay cell that delays an output of the buffer by the first delay time; and a Sheffer stroke performing unit that performs a Sheffer stroke operation with respect to the output of the buffer and an output of the delay cell, and that outputs the load enable signal.

In another aspect, a low drop out (LDO) regulator regulates a power supply voltage and applies the regulated power supply voltage to a load, the LDO regulator comprising: an output node connected to the load; a pass transistor that applies the power supply voltage to the output node; and a controller that reduces a current flowing through the pass transistor by increasing a gate voltage of the pass transistor after receiving a regulator enable signal.

In one embodiment, the controller comprises: a buffer that buffers the regulator enable signal; a delay cell that delays an output of the buffer by the first delay time; an inverter that inverts an output of the delay cell; and a logical conjunction performing unit that performs a logical conjunction operation with respect to the output of the buffer and an output of the inverter, and that outputs a second gating signal that causes an increase in the gate voltage of the pass transistor to a voltage corresponding to the power supply voltage, wherein the LDO regulator further comprises: a PMOS diode having one terminal connected to the power supply voltage; and a PMOS transistor having one terminal connected to another terminal of the PMOS diode and having another terminal connected to a gate of the pass transistor, the PMOS transistor being activated by the second gating signal, and the PMOS transistor applying the voltage corresponding to the power supply voltage to the gate voltage of the pass transistor.

BRIEF DESCRIPTION OF THE DRAWINGS

Exemplary embodiments of the inventive concept will be more clearly understood from the following detailed description, taken in conjunction with the accompanying drawings in which.

DETAILED DESCRIPTION OF EMBODIMENTS

Figure 1:
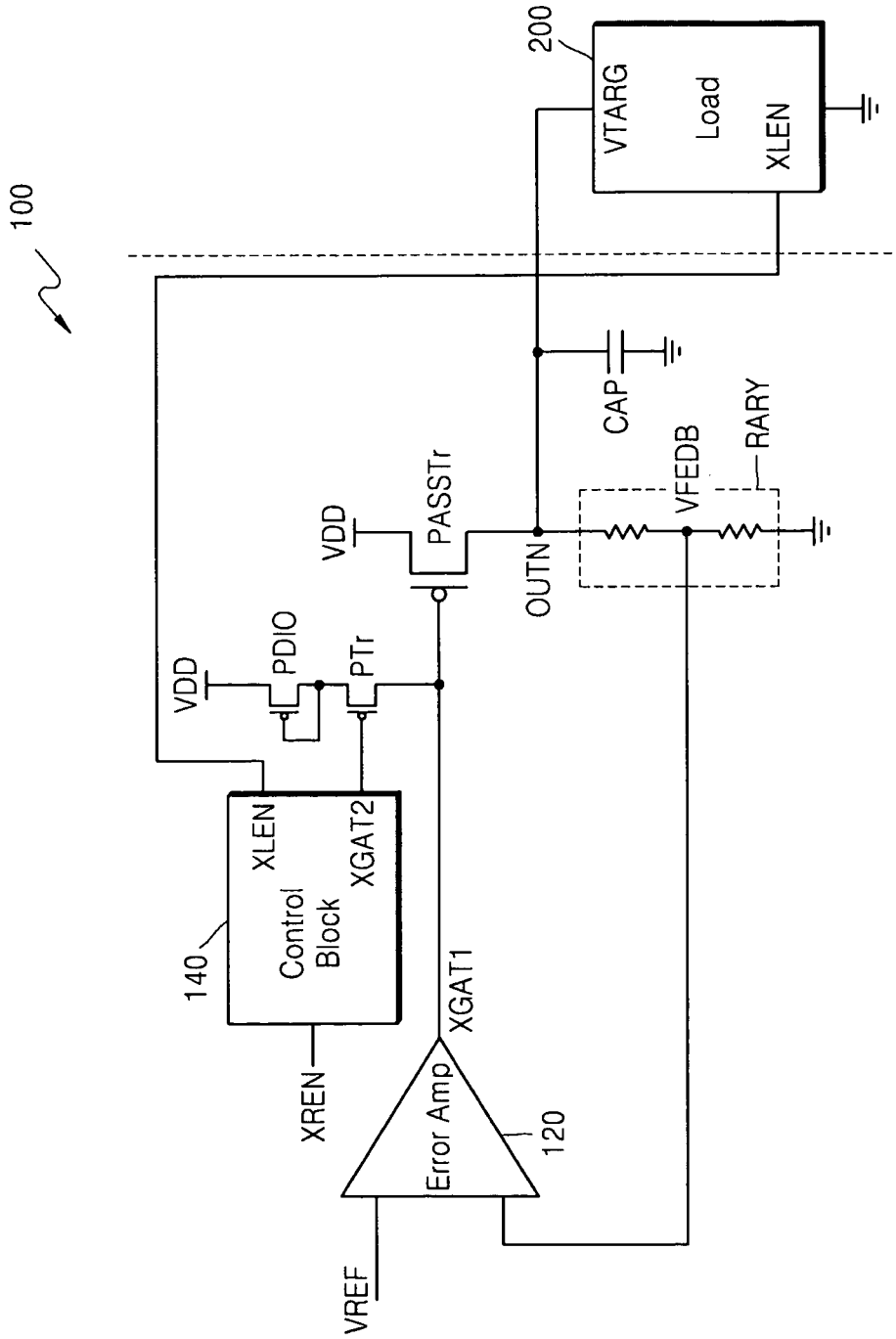
FIG. 1 is a block circuit diagram of a low drop out (LDO) regulator according to an exemplary embodiment.

The attached drawings for illustrating preferred embodiments of the inventive concept are referred to in order to gain a sufficient understanding of the inventive concept, the merits thereof, and the objectives accomplished by the implementation of the inventive concept.

The inventive concept will now be described more fully with reference to the accompanying drawings, in which exemplary embodiments of the invention are shown. Like reference numerals in the drawings denote like elements.

FIG. 1 is a block circuit diagram of a low drop out (LDO) regulator 100 according to an exemplary embodiment.

Referring to FIG. 1, the LDO regulator 100 applies a power supply voltage VDD to a load 200 connected to an output node OUTN in response to a regulator enable signal XREN. In this regard, the power supply voltage VDD may be a voltage as required by a universal serial bus (USB) or a voltage of a battery.

The LDO regulator 100 may include a pass transistor PASSTr having one terminal connected to the power supply voltage VDD and another terminal connected to the output node OUTN in order to apply the power supply voltage VDD to the output node OUTN. In one embodiment, the pass transistor PASSTr can comprise a PMOS transistor. In a case where the pass transistor PASSTr is turned on, the power supply voltage VDD connected to one terminal of the pass transistor PASSTr is applied to the output node OUTN connected to the other terminal thereof.

The LDO regulator 100 includes a capacitor CAP connected to the output node OUTN in parallel with the load 200 in order to prevent a ripple of the voltage that can otherwise occur at the output node OUTN. In a case where the pass transistor PASSTr is turned on, the power supply voltage VDD connected to the first terminal of the pass transistor PASSTr is applied to the output node OUTN connected to the other terminal thereof, and the capacitor CAP is thereby charged.

A capacitance of the capacitor CAP can have a value that corresponds to a voltage level of a target voltage VTARG that is to be applied to the load 200 by the LDO regulator 100.

In the event the capacitor CAP is charged, and the output node OUTN has the voltage level of the target voltage VTARG, the voltage of the output node OUTN is applied to the load 200 as the target voltage VTARG. In this regard, a resistor array RARY that distributes the voltage of the output node OUTN by a predetermined amount can be connected to the output node OUTN in order to monitor the voltage level of the output node OUTN.

An error amplifier 120 generates a first gating signal XGAT1 corresponding to a difference between a reference voltage VREF and a feedback voltage VFEDB fed back by the resistor array RARY. In this regard, the value of the reference voltage VREF may be the same as the voltage of the target voltage VTARG as distributed by the predetermined amount by the resistor array RARY.

In this manner, the error amplifier 120 controls gating of the pass transistor PASSTr so that the first gating signal XGAT1 causes the feedback voltage VFEDB corresponding to the target voltage VTARG to be the same as the reference voltage VREF.

In this regard, the first gating signal XGAT1 has a voltage level corresponding to the difference between the reference voltage VREF and the feedback voltage VFEDB. Therefore, a gate voltage may be established to be quite low in order to gate the pass transistor PASSTr by using the first gating signal XGAT1 corresponding to the difference between the reference voltage VREF and the feedback voltage VFEDB.

However, since an operational bandwidth of the error amplifier 120 is not unlimited during an initial enabling stage of the LDO regulator 100, although the reference voltage VREF and the feedback voltage VFEDB may be the same as each other, or substantially the same, the pass transistor PASSTr can remain in an on state during a period of time corresponding to the operational bandwidth of the error amplifier 120.

As a result, an inrush current is generated, which rapidly charges the capacitor CAP. The charged capacitor CAP rapidly increases the voltage of the output node OUTN and thus an overshooting voltage may be applied to the load 200. As described above, such an application of the overshooting voltage to the load 200 can, in turn, cause malfunction and damage of the load 200.

To prevent such limitations, the LDO regulator can be provided with an error amplifier 120 having an exceptionally large operational bandwidth, which would increase a speed of the error amplifier 120. However, in this case, the current consumption of the error amplifier 120 would increase. In particular, since current consumption of a mobile application is a critical consideration, this is not an effective solution for mobile applications.

In order to address the above limitations, the LDO regulator 100 includes a controller 140 that enables the load 200 after the voltage of the output node OUTN reaches the target voltage VTARG.

Figure 2:
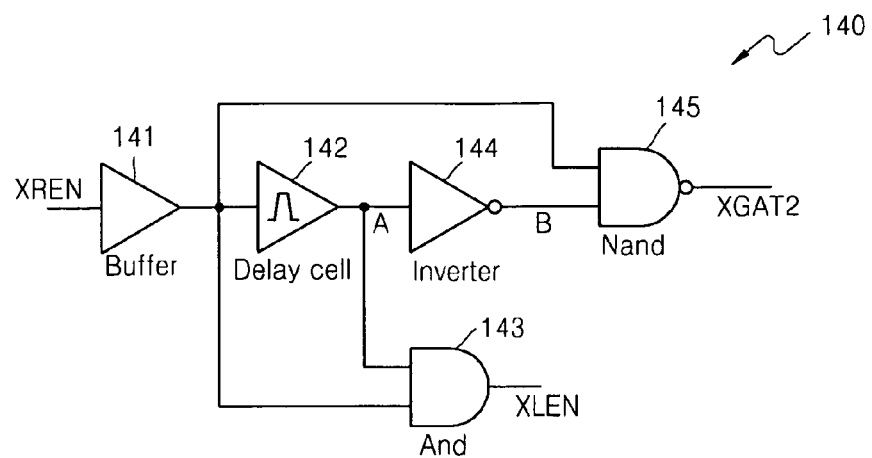
FIG. 2 is a circuit diagram of a controller of FIG. 1.

FIG. 2 is a circuit diagram of the controller 140.

Referring to FIG. 2, the controller 140 includes a buffer 141 that buffers the regulator enable signal XREN, a delay cell 142 that delays an output of the buffer 141 by a first delay time, and a logical conjunction performing unit 143 that performs a logical conjunction operation with respect to the output of the buffer 141 and an output of the delay cell 142, and outputs a load enable signal XLEN that controls enabling of the load 200.

The load enable signal LEN can be a signal obtained by delaying the regulator enable signal XREN. In this regard, the controller 140 can include one or more delay cells 142.

The controller 140 further includes an inverter 144 that inverts the output of the delay cell 142, and a Sheffer stroke performing unit 145 that performs a Sheffer stroke operation with respect to the output of the buffer 141 and an output of the inverter 144 and outputs a second gating signal XGAT2 that controls the gating of the pass transistor PASSTr.

Referring to FIG. 1, the LDO regulator 100 further includes a PMOS transistor PTr that is gated by the second gating signal XGAT2, and has one terminal connected to a gate of the pass transistor PASSTr and another end connected to one terminal of a PMOS diode PDIO. Another terminal of the PMOS diode PDIO can be connected to the power supply voltage VDD. The PMOS transistor PTr is gated by the second gating signal XGAT2, and is active when the second gating signal XGAT2 is in a logic low state L, and applies a gate voltage to the pass transistor PASSTr.

Figure 3:
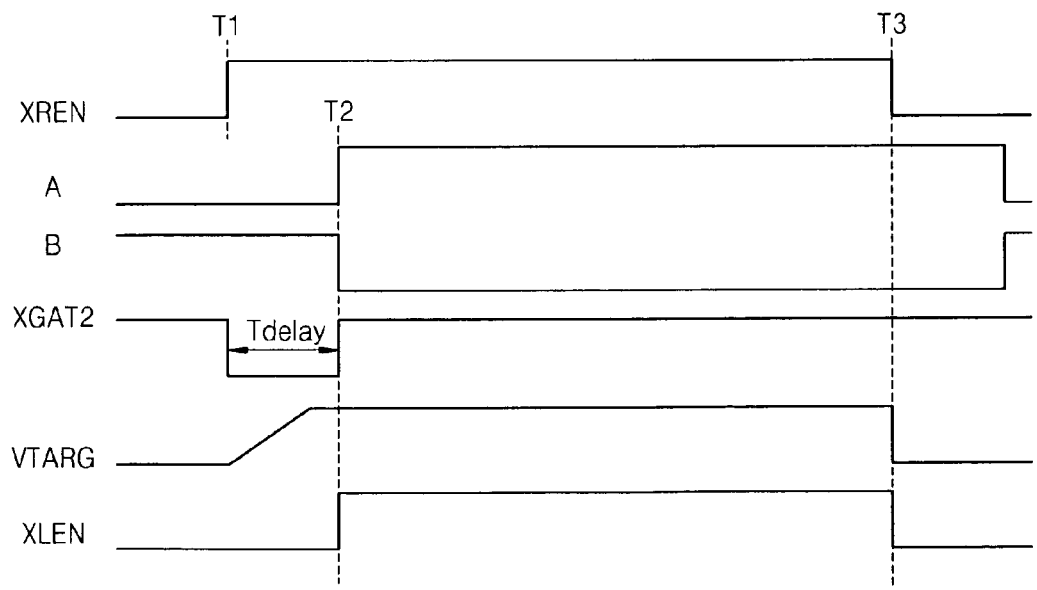
FIG. 3 is a timing diagram of an operation of the controller of FIG. 2.

FIG. 3 is a timing diagram of an operation of the controller 140. The operation of the controller 140 will now be described with reference to FIGS. 1 through 3.

At a first time T1, when the regulator enable signal XREN is transitioned from a logic low state L to a logic high state H, the second gating signal XGAT2 is transitioned from the logic high state H to the logic low state L. The PMOS transistor PTr and the PMOS diode PDIO are turned on by the second gating signal XGAT2 being in the logic low state L so that the gate voltage of the pass transistor PASSTr remains closer in voltage level to that of the power supply voltage VDD.

Therefore, since a source-gate voltage of the pass transistor PASSTr is quite low, the capacitor CAP is charged according to a very low current Itr of the pass transistor PASSTr. In this regard, the Sheffer stroke performing unit 145 performs a Sheffer stroke operation with respect to the regulator enable signal XREN in the logic high state H and a delay-inverted regulator enable signal B prior to the second time T2 that elapses over a first delay time Tdelay by the delay cell 142 so that the second gating signal XGAT2 remains in the logic low state L.

Therefore, the capacitor CAP is charged between the first time T1 and second time T2. If the voltage of the output node OUTN reaches the target voltage VTARG according to the charged capacitor CAP, the reference voltage VREF and the feedback voltage VFEDB are the same as each other so that the pass transistor PASSTr is turned off. That is, the output node OUTN is set to have the target voltage VTARG. In one embodiment, the first delay time Tdelay can be established to be greater than the time taken for the voltage of the output node OUTN to reach the target voltage VTARG.

At the second time T2 that elapses after the first delay time Tdelay, a delayed regulator enabled signal A is transitioned to the logic high state H from the logic low state L. Since the inverter 144 inverts the delayed regulator enabled signal A, the Sheffer stroke performing unit 145 outputs the second gating signal XGAT2 in the logic high state H. That is, the second gating signal XGAT2 is placed in the logic high state H after the second time T2 period.

The PMOS transistor PTr and the PMOS transistor PDIO are turned off by the second gating signal XGAT2 being in the logic high state H. Thus, after the second time T2, the first gating signal XGAT1 controls the gating of the pass transistor PASSTr. In one embodiment, the first gating signal XGAT1 which is the output of the error amplifier 120 controls the gating of the pass transistor PASSTr in manner described above.

At the second time T2, the conjunction performing unit 143 that performs an AND operation with respect to the regulator enable signal XREN in the logic high state H and the delayed regulator enable signal A outputs the load enable signal XLEN in the logic high state H. Thus, the load 200 is enabled, and, since the output node OUTN has the target voltage VTARG at the second time T2, the target voltage VTARG is applied to the load 200.

Until the regulator enable signal XREN is disabled in a logic low state L at a third time T3, the error amplifier 120 controls the gating of the pass transistor PASSTr, as described above, according to the difference between the target voltage VTARG and the voltage level of the output node OUTN corresponding to the voltage of the capacitor CAP. Thus, the pass transistor PASSTr is repeatedly turned on/off so that the voltage of the output node OUTN maintains the target voltage VTARG.

The LDO regulator 100 reduces an amount of a current supplied to the output node OUTN by establishing a large gate voltage of the pass transistor PASSTr at an initial enabling stage, thereby preventing an overshooting voltage and an inrush current, and accordingly preventing malfunction of, and damage to, the load 200.

Figure 4:
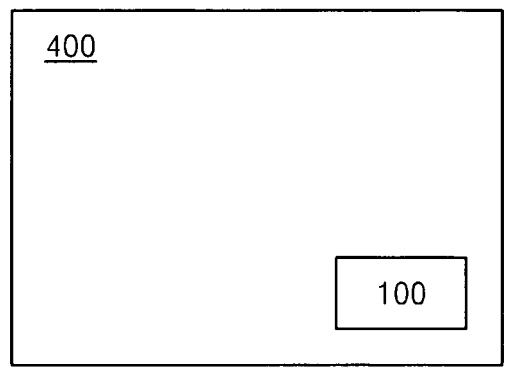
FIG. 4 is a diagram of a semiconductor device including the LDO regulator of FIG. 1 according to an exemplary embodiment.

FIG. 4 is a diagram of a semiconductor device 400 including the LDO regulator 100 according to an exemplary embodiment.

Referring to FIG. 4, the semiconductor device 400 regulates a voltage of an USB or a voltage of a battery applied to the semiconductor device 400 by utilizing the LDO regulator 100, and may use the regulated voltage as an operational voltage of the semiconductor device 400. In this regard, the semiconductor device 400 may be a mobile device, such as a mobile phone, a PDA, a PMP, and the like.

While the inventive concept has been particularly shown and described with reference to exemplary embodiments thereof, it will be understood that various changes in form and details may be made therein without departing from the spirit and scope of the following claims.

What is claimed is:

1. A low drop out (LDO) regulator that regulates a power supply voltage and applies the regulated power supply voltage to a load, the LDO regulator comprising:
   an output node connected to the load;
   a pass transistor that applies the power supply voltage to the output node; and
   a controller that generates a load enable signal enabling the load by delaying a regulator enable signal by a first delay time and outputs the load enable signal to the load, and the controller increases a gate voltage of the pass transistor after the controller receives the regulator enable signal to thereby reduce a current flowing through the pass transistor.

2. The LDO regulator of claim 1, further comprising an error amplifier that outputs a first gating signal controlling gating of the pass transistor, a voltage of the first gating signal corresponding to a difference between a reference voltage and a feedback voltage, the feedback voltage corresponding to a voltage of the output node.

3. The LDO regulator of claim 1, wherein the power supply voltage is a voltage of a universal serial bus (USB).

4. The LDO regulator of claim 1, wherein the power supply voltage is a voltage of a battery.

5. The LDO regulator of claim 1, wherein the controller comprises:
   a buffer that buffers the regulator enable signal;
   a delay cell that delays an output of the buffer by the first delay time;
   an inverter that inverts an output of the delay cell;
   a logical conjunction performing unit that performs a logical conjunction operation with respect to the output of the buffer and an output of the inverter, and that outputs a second gating signal that causes an increase in the gate voltage of the pass transistor to a voltage corresponding to the power supply voltage; and
   a Sheffer stroke performing unit that performs a Sheffer stroke operation with respect to the output of the buffer and the output of the delay cell, and that outputs the load enable signal.

6. The LDO regulator of claim 5, further comprising:
   a PMOS diode having one terminal connected to the power supply voltage; and
   a PMOS transistor having one terminal connected to another terminal of the PMOS diode and having another terminal connected to the gate of the pass transistor, the PMOS transistor being activated by the second gating signal, and the PMOS transistor applying the voltage corresponding to the power supply voltage to the gate voltage of the pass transistor.

7. A low drop out (LDO) regulator that regulates a power supply voltage and that applies the regulated power supply voltage to a load, the LDO regulator comprising:
   an output node connected to the load;
   a pass transistor that applies the power supply voltage to the output node; and
   a controller that generates a load enable signal by delaying a regulator enable signal by a first delay time and that outputs the load enable signal to the load to enable the load.

8. The LDO regulator of claim 7, wherein the controller comprises:
   a buffer that buffers the regulator enable signal;
   a delay cell that delays an output of the buffer by the first delay time; and a Sheffer stroke performing unit that performs a Sheffer stroke operation with respect to the output of the buffer and an output of the delay cell, and that outputs the load enable signal.

9. A low drop out (LDO) regulator that regulates a power supply voltage and applies the regulated power supply voltage to a load, the LDO regulator comprising:
an output node connected to the load;
a pass transistor that applies the power supply voltage to the output node; and
a controller that reduces a current flowing through the pass transistor by increasing a gate voltage of the pass transistor after receiving a regulator enable signal,
wherein the controller comprises:
a buffer that buffers the regulator enable signal;
a delay cell that delays an output of the buffer by the first delay time;
an inverter that inverts an output of the delay cell; and
a logical conjunction performing unit that performs a logical conjunction operation with respect to the output of the buffer and an output of the inverter, and that outputs a second gating signal that causes an increase in the gate voltage of the pass transistor to a voltage corresponding to the power supply voltage, and
wherein the LDO regulator further comprises:
a PMOS diode having one terminal connected to the power supply voltage; and
a PMOS transistor having one terminal connected to another terminal of the PMOS diode and having another terminal connected to a gate of the pass transistor, the PMOS transistor being activated by the second gating signal, and the PMOS transistor applying the voltage corresponding to the power supply voltage to the gate voltage of the pass transistor.

10. A semiconductor device that has a low drop out (LDO) regulator that regulates a power supply voltage and applies the regulated power supply voltage to a load, the LDO regulator comprising:
an output node connected to the load;
a pass transistor that applies the power supply voltage to the output node; and
a controller that generates a load enable signal enabling the load by delaying a regulator enable signal by a first delay time and outputs the load enable signal to the load, and the controller increases a gate voltage of the pass transistor after the controller receives the regulator enable signal to thereby reduce a current flowing through the pass transistor.

11. The semiconductor device of claim 10, wherein the LDO regulator further comprises an error amplifier that outputs a first gating signal controlling gating of the pass transistor, a voltage of the first gating signal corresponding to a difference between a reference voltage and a feedback voltage, the feedback voltage corresponding to a voltage of the output node.

12. The semiconductor device of claim 10, wherein the power supply voltage is a voltage of a universal serial bus (USB).

13. The semiconductor device of claim 10, wherein the power supply voltage is a voltage of a battery.

14. The semiconductor device of claim 10, wherein the controller comprises:
a buffer that buffers the regulator enable signal;
a delay cell that delays an output of the buffer by the first delay time;
an inverter that inverts an output of the delay cell;
a logical conjunction performing unit that performs a logical conjunction operation with respect to the output of the buffer and an output of the inverter, and that outputs a second gating signal that causes an increase in the gate voltage of the pass transistor to a voltage corresponding to the power supply voltage; and
a Sheffer stroke performing unit that performs a Sheffer stroke operation with respect to the output of the buffer and the output of the delay cell, and that outputs the load enable signal.

15. The semiconductor device of claim 14, wherein the controller comprises:
a PMOS diode having one terminal connected to the power supply voltage; and
a PMOS transistor having one terminal connected to another terminal of the PMOS diode and having another terminal connected to the gate of the pass transistor, the PMOS transistor being activated by the second gating signal, and the PMOS transistor applying the voltage corresponding to the power supply voltage to the gate voltage of the pass transistor.

16. The semiconductor device of claim 15, wherein the controller further comprises a capacitor connected to the output node in parallel with the load.

17. The semiconductor device of claim 16, wherein the capacitor has a value corresponding to a voltage level of a target voltage, the target voltage being applied to the load.

18. The semiconductor device of claim 17, when the capacitor is charged, and the output node has the voltage level of the target voltage, the voltage of the output node is applied to the load as the target voltage.

19. The semiconductor device of claim 10, being a mobile device.

* * * * *